United States Patent

[11] 3,528,405

[72] Inventor Graham Travers Schuler
Ottawa, Ontario, Canada
[21] Appl. No. 629,534
[22] Filed April 10, 1967
[45] Patented Sept. 15, 1970
[73] Assignee Canadian Patents and Development, Limited
Ottawa, Ontario, Canada
a corporation of Canada

[54] LOW NOISE DIFFERENTIAL AMPLIFIER FOR MEASURING BIOLOGICAL SIGNALS
1 Claim, 2 Drawing Figs.

[52] U.S. Cl. .......... 128/2.1, 330/30
[51] Int. Cl. .......... A61b 5/04, H03f 3/68
[50] Field of Search .......... 128/2, 2.05, 2.06, 2.1; 330/30

[56] References Cited
UNITED STATES PATENTS
3,029,808 4/1962 Kagan .......... 128/2.06

*Primary Examiner*—Delbert B. Lowe
*Attorney*—James R. Hughes

ABSTRACT: A low noise differential amplifier for biological applications comprising two transistors whose inputs are connected directly to two electrodes positioned on the subject and which operate with reference to a voltage obtained from a third reference electrode also positioned on the subject. The emitters of the transistors are connected through a capacitor of large capacitance value and the outputs of the transistors are fed to a difference amplifier that provides a difference voltage output in relation to ground. A fourth electrode positioned on the subject is connected to ground.

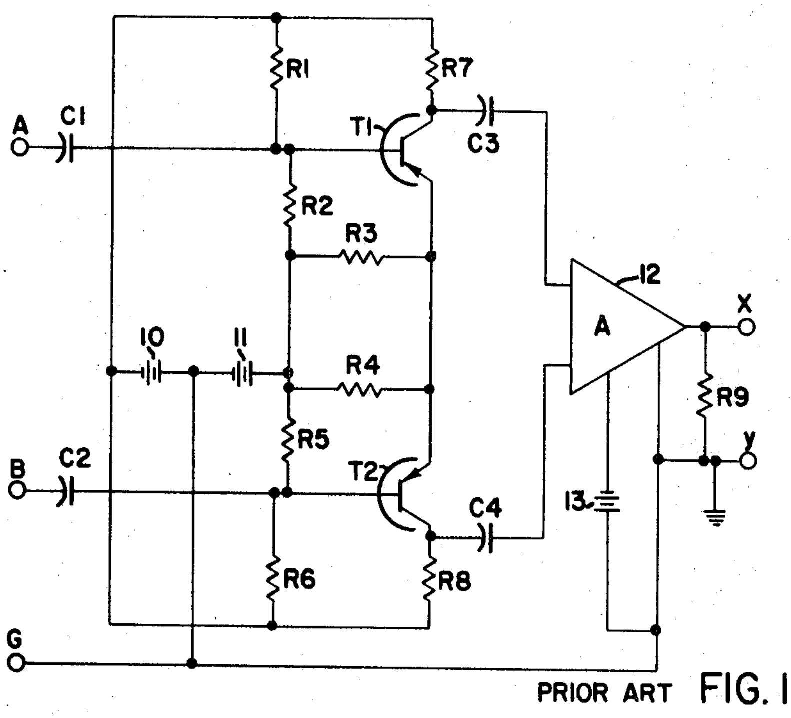
PRIOR ART FIG. 1
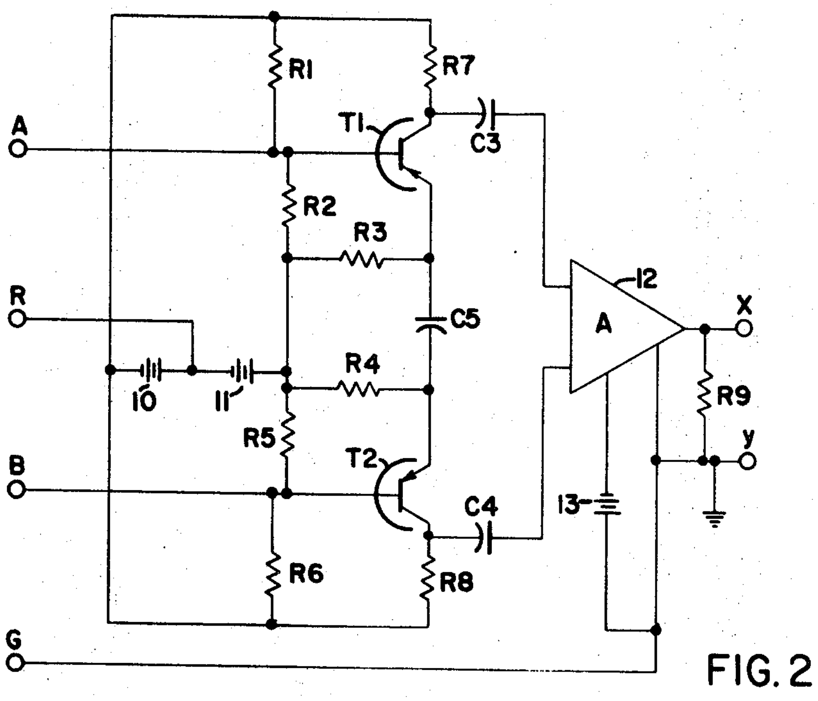
FIG. 2
INVENTOR
GRAHAM T. SCHULER
By [signature]
AGENT

LOW NOISE DIFFERENTIAL AMPLIFIER FOR MEASURING BIOLOGICAL SIGNALS

This invention relates to a low-noise interference-resistant differential amplifier.

Differential amplifiers are commonly used to achieve a resultant signal which is the difference of two input signals. Differential amplifiers are also used to achieve a desired resultant signal when relatively large unwanted artifactual signals are associated with a desired signal of very low magnitude. In the latter application, the differential amplifier amplifies the desired signal which is unequal in magnitude at the input electrodes, while not amplifying (suppressing) the artifactual signals which are relatively common to the inputs.

In biological applications, biologic source signal levels in the order of a few microvolts are frequently encountered while artifactual potentials of a few to thousands of microvolts are also encountered. These artifactual potentials may arise as chemically induced effects associated with the interface between the biological subject and the input electrode probe of the amplifier; or artifactual voltages from external interfering sources, impressed upon the biological subject as a result of the impedance associated with the grounding electrode of the differential amplifier, *i.e.*, imperfect grounding of the biological subject. If, as is frequently the case, the impedances between the signal source (biological subject) and the amplifier inputs are unequal, interfering signals which should be common to both inputs of the amplifier, (common mode singals) will have suffered unequal voltage drops across the different electrode impedances. These unequal voltage drops will appear at the output of the differential amplifier as an amplified "noise".

In biological difference amplifiers of the prior art, each input has an isolating capacitor to isolate the amplifier from the aforementioned electrode interface potentials and also to isolate the biologic subject from transistor circuit potentials. This capacitor, for biological low frequency operation, must have a high capacitance. Such large capacitances inherently generate noise and cause current and voltage leakages. Moreover, in order to maintain a high common mode rejection, the capacitors are matched for leakage and temperature effects. For like reasons, the transistors are also matched for gain, temperature effects and noise.

It is therefore an object of the invention to provide a difference amplfier with a high common mode rejection, a high common mode input impedance and low noise.

The invention achieves an improved signal-to-noise ratio and a higher common mode input impedance, and also an enhanced common mode rejection. The enhanced common mode rejection is achieved by eliminating the input isolating capacitors of the conventional differential amplifier, inserting an inter-emitter capacitor, and employing a reference electrode. The inter-emitter capacitor limits the gain of the amplifier at frequencies below those of biological interest, greatly decreasing low frequency noise. This capacitor also reduces the problems of matching the transistors for gain and base-emitter voltages as well as temperature effects. The effects of impedance differences between the input electrodes of the amplifier and the biological subject are largely overcome by the use of a reference electrode.

Accordingly the invention contemplates improvements in a differential amplifier for amplifying a biological signal generated by a biological subject, said amplifier having two transistors with the signal output appearing across the collectors thereof, the improvements comprising:

a. Means for directly connecting the biological signal to the bases of the transistors; and b. Means including a capacitance of large magnitude connecting the emitters of the transistors, whereby common mode input impedance and the common mode rejection ratio as well as the signal-to-noise ratio are enhanced.

The invention also contemplates a reference electrode connectable to the biological subject, said electrode connected through equal impedances to the bases whereby signals common to both transistors are also common to the reference electrode whereby enhanced common mode rejection is achieved.

An embodiment of the invention will now be described by way of example, reference being had to the accompanying drawings in which:

FIG. 1 is a schematic of a differential amplifier of the prior art; and

FIG. 2 is a schematic of a differential amplifier using the embodiments of the invention.

In the drawings like numbers refer to like elements and, referring to FIG. 1, bipolar transistors T1 and T2 have their emitters interconnected. The base of transistor T1 connects with an input electrode A through a coupling capacitor C1, while the base of transistor T2 connects with an input electrode B through a coupling capacitor C2. The base of transistor T1 is connected to the negative electrode of a battery 10 through a resistor R1 and is also connected through a resistance R2 to the positive electrode of a battery 11 in series with the battery 10. The emitter of this transistor T1 is also connected to the positive electrode of battery 11 through a resistance R3. In a like manner the emitter of transistor T2 connects with the positive electrode of battery 11 through a resistance R4. The base of transistor T2 connects to the positive electrode of the battery 11 through a resistance R5 and to the negative electrode of the battery 10 through a resistance R6. The collectors of the transistors T1 and T2 are respectively connected to the negative electrode of the battery 10 through resistances R7 and R8. Capacitors C3 and C4 respectively connect the collectors of the transistors T1 and T2 to the inputs of an amplifier 12 powered by a battery 13, the positive electrode of which is connected to a ground electrode G. attached to the biological subject and connected to ground. The output of the amplifier is connected to an output electrode X which is connected to ground through a load resistance R9. An output electrode Y is also connected to ground. The positive electrode of the battery 10 is grounded, as is the negative electrode of the battery 11.

Referring to FIG. 2, the bypass capacitors C1 and C2 are eliminated and the base connections of the transistors are directly connected to the electrodes A and B, respectively. A capacitor C5 is interposed between the emitters of the transistors T1 and T2 such that emitter current flows from battery 11 through the resistor R3 to the emitter of transistor T1 and through the resistor R4 to the emitter of transistor T2. The ground connection of the positive electrode of the battery 10 and the negative electrode of the battery 11 to electrode G is eliminated and instead these battery electrodes are connected to a reference electrode R.

Referring to FIG. 1, in operation, input signals are imposed upon electrodes A and B by suitable means, as by probes. The input signals will consist of differential components which are desired and interference components, *i.e.*, common mode components, which are to be eliminated or reduced. (The base coupling capacitors C1 and C2 are large electrolytics since a low impedance path to the signal source is required). Theoretically, the common mode inphase components are not amplified and appear relatively unchanged at the inputs of amplifier 12, providing the gain of each transistor circuit T1 and T2 is the same and operating conditions are identical, (which is most easily ensured if the transistors are matched for gain, temperature effects, and noise; and the capacitors C1 and C2 matched for leakage and temperature effects). This optimizes rejection; that is, the common mode signals are unchanged while the source signal is amplified. Since, in practice, optimum rejection is impossible, it is provided that the difference signals applied to the electrodes A and B are amplified and appear out-of-phase at the inputs of the amplifier 12. The amplifier 12, being the differential amplifier, creates an output at electrodes X and Y which is the algebraic difference of the input signals.

Referring now to FIG. 2, the operation of the amplifier utilizing the embodiments of the invention is almost identical to that of FIG. 1. Input electrodes A and B as well as the reference electrode R and ground electrode G are properly connected to the biological subject, the reference electrode being connected to the subject in reasonably close proximity to the contacts which the electrodes A and B make with the subject. As a result, any impedance for common mode signals which exists between the biological subject and the input electrodes A and B will be largely cancelled out by the reference electrode R since common mode energy is directly supplied by the reference electrode. The biological signals which appear at electrodes A and B will be appropriately amplified and appear at electrodes X and Y.

The elimination of capacitors C1 and C2 eliminates possible noise generation in the input circuit due to inherent impedance and intermittent energy losses associated with the large capacitors necessary to ensure low frequency response. As a result, potential "masking" of the low amplitude biological signal in noise is reduced. The capacitor C5 increases effectively the common mode rejection ratio while also providing circuit stability above the low frequency cut-off (that is, those frequencies at which biological response occurs). Below the cut-off frequency this capacitor tends to reduce transistor gain to less than unity and, as a result, associated noise generation is also reduced. Routinely, enhanced common mode rejection is achieved when the transistors T1 and T2 are matched for gain, but in the invention disclosed all that is required is that the transistors T1 and T2 be selected for lowest noise generation.

The following parts list gives, by way of example, suitable values of the components:

| | | | |
|---|---|---|---|
| T1 | 1/2 2N3811 | C1 | 2 mfd. |
| T2 | 1/2 2N3811 | C2 | 2 mfd. |
| R1 | 8.76M ohms | C3 | |
| R2 | 10M ohms | C4 | |
| R3 | .22M ohms | C5 | 320 mfd. |
| R4 | do | Battery 10 | 8.4 v. |
| R5 | 10M ohms | Battery 11 | 8.4 v. |
| R6 | 8.76M ohms | | |
| R7 | .18M ohms | | |
| R8 | do | | |
| R9 | | | |

Typical characteristics of the amplifiers of FIG. 1 and FIG.

2 using the values of the respective components as shown above are:

| The amplifier of Figure 1 (Prior Art) | | The amplifier of Figure 2 (embodiment discl.) |
|---|---|---|
| 18,000 | Voltage gain | 18,000. |
| 0.2, 60,000 Hz | Frequency response (3 db.) | 0.2, 60,000 Hz. |
| $2.5\times10^6$ ohms | Differential input impedance | $2.5\times10^6$ ohms. |
| $4\times10^6$ ohms | Common mode input impedance | $10^{12}$ ohms. |
| $7\times10^4$:1 | Common mode rejection ratio | $5\times10^6$:1. |
| $5\times10^{-11}$ amp | Inter-electrode current A–G | $6\times10^{-9}$ amp. |
| $5\times10^{-11}$ amp | Inter-electrode current B–G | $5\times10^{-9}$ amp. |
| | RMS noise referred to shorted input: | |
| 1.3$\mu$ volt | 0.2, 10 Hz | .05$\mu$ volt. |
| 0.3$\mu$ volt | 2.0, 100 Hz | 0.1$\mu$ volt. |
| 1.2$\mu$ volt | 20, 1,000 Hz | 1.1$\mu$ volt. |

I claim:

1. A differential voltage amplifier for amplifying a biological signal generated by a biological subject comprising:

a. first and second transistors;

b. first and second electrodes applicable to the biological subject and directly connected to the bases of the first and second transistors respectively;

c. an amplifier having its input connected across the collectors of said transistors and adapted to provide a difference voltage output in relation to ground;

d. a capacitance connected between the emitters of said transistors such as to provide attenuation of unwanted low frequency signals;

e. first and second batteries connected in series and of equal magnitude connected via voltage dividing resistors to the emitters, bases, and collectors of the two transistors;

f. a third electrode applicable to the biological subject directly connected to the junction point between the said series connected batteries such that the said two transistors acting as amplifiers operate with reference to a voltage obtained from the biological subject that is substantially equal in polarity and magnitude to those voltage signals common to the first and second electrodes; and g. a fourth electrode applicable to the biological subject connected directly to ground.